Sept. 22, 1964 M. E. TAYLOR 3,150,327

SELF-ADJUSTING ATTENUATION EQUALIZER

Filed Sept. 29, 1961 3 Sheets-Sheet 1

INVENTOR.
MAURICE E. TAYLOR
BY
ATTORNEY

INVENTOR.
MAURICE E. TAYLOR
BY
ATTORNEY

Sept. 22, 1964 M. E. TAYLOR 3,150,327

SELF-ADJUSTING ATTENUATION EQUALIZER

Filed Sept. 29, 1961 3 Sheets-Sheet 3

INVENTOR.
MAURICE E. TAYLOR
BY
[signature]
ATTORNEY

United States Patent Office 3,150,327
Patented Sept. 22, 1964

3,150,327
SELF-ADJUSTING ATTENUATION EQUALIZER

Maurice E. Taylor, Monroeville, Pa., assignor to Gulf Research & Development Company, Pittsburgh, Pa., a corporation of Pennsylvania Filed Sept. 29, 1961, Ser. No. 141,724
8 Claims. (Cl. 330—126)

This invention relates to electrical equalizing networks, and in particular relates to an automatic self-adjusting attenuation equalizer that is particularly advantageous for use in the seismic geophysical prospecting art.

In many electrical and/or acoustic applications in which a signal traverses a transmission system, some frequency components are attenuated more than others, with the result that the signal is filtered, either intentionally or unintentionally. In many cases the effect of such filtering is to cause successive signal events to overlap and obscure each other. The detrimental effect of the filtering may in many applications be compensated for by subsequently passing the signal through a device that is termed an equalizer and which compensates for the prior filtering action by restoring those frequency components of the signal which were attenuated by the prior filtering. By way of example, when electrical signals are transmitted over a communication channel, the specific characteristics of the transmission line may attenuate certain frequencies more or less than others so that the signal delivered at the end of the channel is not the same as the original signal. By passing the transmitted signal through an attenuation equalizer it is possible to compensate for prior attenuation of respective frequencies.

In the case of transmission over a fixed channel the required characteristics of the equalizer may be prescribed and are fixed. For example U.S. Patent No. 2,359,159 describes a system by which high frequencies and low frequencies may be automatically compressed to a predetermined amplitude ratio in a sound recording system.

In certain applications however, the transmission system is not always the same and may vary in an unpredictable manner. It is apparent that in such cases the required equalizer necessarily must also be varied. This invention provides an attenuation equalizer that is automatically self-adjusting in order that a signal may be compensated for certain types of filtering in spite of unknown variations in the characteristics of the prior transmission system.

One problem to which this invention is directed is encountered in seismic geophysical prospecting operations. It is common in such seismic operations to explode a charge of dynamite at or near the surface of the ground and to pick up the resulting earth tremors at spaced points by means of geophones whose electrical signals are amplified and recorded for subsequent analysis. In such seismic operations filters are often employed in the seismograph amplifiers. It has been found advantageous in seismic prospecting to record the received signals in high-fidelity form, that is to record all received signals in a reliable manner, and to perform the filtering as well as other processing to up-grade the seismogram at a subsequent time during reproduction of the seismogram. For this purpose the seismograms are generally recorded on magnetic tape which may be played back repeatedly with appropriate processing apparatus. Various adjustments in the characteristics of the playback system may be made for the purpose of improving the signal-to-noise discrimination. It is apparent that such operation provides great flexibility in the analysis techniques which may be employed. This invention pertains to a seismogram analysis technique that materially improves the usefulness of a seismic reflection seismogram.

It is well known that a subsurface explosion such as that produced by a charge of dynamite exploded in a shot hole contains substantially all frequency components over a wide range. It is, moreover, well known that the earth tremors commonly recorded at a distant location do not contain all frequencies, and it is recognized that many frequencies have been attenuated somewhere in the intervening transmission system. One may conclude that the transmission system has filtered the signal. Both the degree and the nature of the filtering is known to vary materially from place to place. Several types of filtering are known to be produced by the earth transmission system. Considerable filtering occurs during transmission of the seismic impulse through the body of the earth material which is known to attenuate the high frequencies more than the low frequencies. Filtering is also known to occur at various other points in the transmission system. A certain amount of filtering occurs in the immediate vicinity of the shot due to the elastic and plastic properties of the soil. Further filtering occurs in the immediate vicinity of the geophone which has the characteristics of a mass supported on an elastic earth. Still further filtering may be introduced by the electro-mechanical system inside the geophone itself, and in the amplifier and recording system connected thereto. In general the very low frequencies suffer attenuation through the geophone and seismic recording equipment. Accordingly, it is commonly found that the recorded seismic signal is relatively deficient in low frequencies and also deficient in high frequencies, and that the amplitude versus frequency curve reaches a peak in the frequency range of 10 to 100 c.p.s.

Another quite different type of filtering is effected by a sedimentary geological section having the characteristics of a multilayered transmission medium in which many reverberations by multiple reflection may occur. A seismic impulse traveling substantially perpendicular to the layering is affected by this type of filtering. In a multilayered earth the transmission medium varies in a manner characterized by discrete (but unknown) acoustical discontinuities. Both the nature and the degree of the filtering produced by the earth layering depends on the acoustical properties of the successive members in the sequence of earth layers. In seismic reflection operations it is desired to obtain information about the earth layers from the seismic reflections recorded on a reflection seismogram.

One reliable way of determining the acoustical properties of the earth layers is by running a continuous acoustic velocity log in a borehole that traverses the layers. Apparatus and commercial services for obtaining such a log are well known. Upon examining a continuous velocity log (CVL), one observes many discrete changes in velocity occurring at formation interfaces. It is of course an ultimate objective of seismic reflection shooting to determine the depth and character of the discontinuities pictured on a CVL, but without the necessity of drilling an expensive borehole. Accordingly, in processing a seismic reflection record it is desirable to improve the signal-to-noise ratio of reflected events, but to avoid any effect that would tend to mask the resemblance of the reflection seismogram to a CVL taken at the location if a borehole were available.

From the above discussion it is apparent that two types of filtering have acted on a recorded seismic impulse that had its origin in a shot substantially at the earth's surface and that traveled to a deep reflecting horizon and back up to a geophone located substantially at the earth's surface where the event was eventually recorded. One type of filtering is the attenuation of low frequencies and of high frequencies, the steady state frequency response for this type of filtering being represented by a curve whose shape is that of a smooth hump having a maximum in the range of 10 to 100 c.p.s. The other type of filtering is the attenuation of certain narrow bands of frequencies that are actually related to the discontinuities in the CVL. In the processing of reflection seismograms it is desirable to compensate for the first type of filtering, without however compensating the second type of filtering, since the latter is related to the useful information (subsurface layering) which the seismic prospecting operation is meant to reveal.

This invention is an improvement over the Self-Adjusting Attenuation Equalizer described in copending prior application Ser. No. 851,283, filed November 6, 1959, by Darby, Dean, and Taylor, and assigned to the same assignee as the present application. The attenuation equalizer described in said prior application is capable of compensating for the first above-mentioned type of filtering. However, when the second above-mentioned type of filtering is taken into consideration, it is found that the attenuation equalizer of said prior application has the disadvantage that it tends to restore or compensate certain frequency components of the original signal that were removed by the peculiar action of the particular layered earth whose velocity layering is pictured by the CVL. The apparatus of said prior application in restoring the removed frequency thus tends to mask an important earth characteristic which the seismic operation should reveal.

It is the purpose of this invention to provide a self-adjusting attenuation equalizer that will to a substantial degree compensate for the relatively broad filtering that takes place during transmission of the seismic impulse from the source shot to the seismogram, without however masking the sharp characteristic narrow band attenuation effect of the particular succession of earth layers encountered by the impulse in a reflection trajectory.

The invention will be described in its application to seismic geophysical prospecting, but it is to be understood that this is by way of example only, and the invention is not limited thereto. The invention is applicable to any transmission system in which both smooth variations in attenuation and sharp variations in attenuation occur, and the apparatus of this invention will serve to compensate for the smooth or continuous variations in attenuation without materially affecting compensation for narrow band or sharp variations in the attenuation of the transmitting medium.

The invention will be described with reference to the accompanying drawings forming part of this specification and in which FIGURE 1 is a block diagram showing the relationship of the various components of this invention;

In the apparatus of this invention the signal to be equalized is transmitted to a plurality of sharply tuned band-pass filter channels each of which is peaked at a different frequency in the frequency range of interest, the input circuits of the filter channels being connected electrically in parallel. After traversing the filter, the signal in each channel is operated upon by an automatic gain-control element that is signal actuated in a special manner. Each gain-control element is actuated by a signal that depends not only on the signal in its own channel, but each gain-control element is actuated also by the control signals from a number of channels of adjacent frequencies, so that each gain-control element is actuated by a signal combination that serves to average out the variations of gain with frequency over a selected band of frequencies whose width is much wider than that of any particular channel. By this means the apparatus of this invention attains equalization that compensates for the smooth and relatively broad variation in attenuation caused by prior filtering, but the apparatus does not compensate for sharp narrow band variations in attenuation caused by prior filtering. In this manner the apparatus when used to process a reflection seismogram compensates for the relatively smooth attenuation of high and low seismic frequencies without masking the narrow band attenuation of particular frequencies that are characteristic of the CVL.

Figure 1:
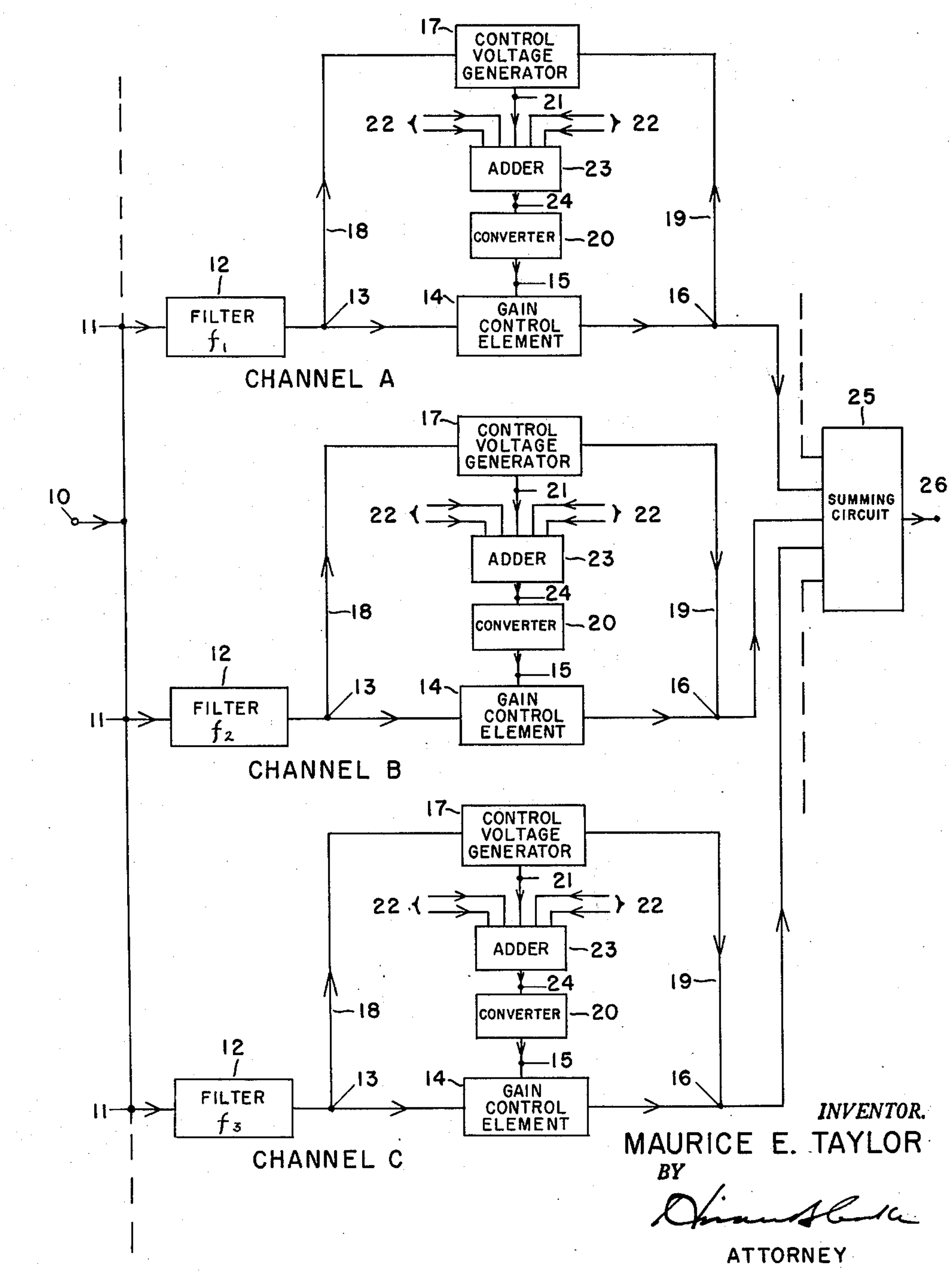

Referring to FIGURE 1 the signal to be equalized is applied at an input terminal 10. Connected in parallel to the input terminal 10 are a number of filter channels A, B, C, etc. each of which includes a narrow band-pass filter 12 peaked at a different frequency $f_1$, $f_2$, $f_3$, etc. in the frequency range of interest. Only three filter channels A, B, C, etc. are shown in FIGURE 1, each having an input terminal 11 and an output terminal 16, but it is to be understood that a large number of channels is ordinarily employed. Operation of the equalizer of this invention is materially improved by employing a large number of filter channels whose respective pass bands are distributed over the frequency range of interest in a regular, though not necessarily uniform, manner. For example, in the analysis of a seismic reflection seismogram a total of fifty to one hundred such filter channels may be employed each having a filter that is peaked at a different frequency. The peak frequencies $f_1$, $f_2$, $f_3$, etc. of the respective filters 12 may be distributed over the region of interest in any one of a number of ways but it is preferred to employ a logarithmic frequency distribution. The filter channels are connected with their input terminals 11 in parallel to the input terminal 10 so that the signal to be equalized is applied simultaneously to each of the respective filter channels A, B, C, etc.

Since the filter channels A, B, C, etc. are substantially identical with the exception of the peak frequency to which it is tuned, only one of them will be described in detail. The output of the filter element 12 is delivered at the terminal 13. The output of the filter 12 may be amplified if necessary and is transmitted to a gain-control element 14. The gain-control element 14 is adapted to adjust the gain of its channel in response to a signal applied to a control terminal 15 of the gain-control element. A distinction is made between the signal of essentially a single frequency transmitted through the control element 14 from terminal 13 to terminal 16, and the control signal that is applied to the control terminal 15 of the gain-control element 14 in order to adjust the gain thereof. In FIGURE 1 the gain-control element 14 is shown having a control terminal 15 to which the control signal is electrically applied, but under certain circumstances as will become evident later, the control signal need not necessarily be electrical and may take other forms. Accordingly, by the control terminal 15 is meant the point of entry of any type of control signal into the gain-control element 14. Output of the respective filter channels is delivered at its terminal 16.

Each filter channel A, B, C, etc. has a control-voltage generator 17 whose output signal is applied to the control terminal 15 of the gain-control element 14. The control-voltage generator 17 is actuated by filtered signal in the respective channel. In FIGURE 1 the control-voltage generator 17 may be connected by lead 18 to terminal 13 subsequent to the filter 12 but ahead of the gain-control element 14. Alternatively the control-voltage generator 17 may be connected by lead 19 to the output terminal 16 subsequent to the gain-control element 14. It is highly desirable that action of the combination of the control-voltage generator 17 and the gain-control element 14 be such as to maintain a substantially constant average signal level at the terminal 16 over a wide range of signal level applied at the terminal 13. To this end it is preferred to connect the control-voltage generator 17 to both the terminal 13 and the terminal 16 in a manner to be described in detail later.

It is apparent that in a circuit of the type illustrated in FIGURE 1 undesirable distortion may occur. In order to avoid such distortion it is preferred to introduce the control signal into the control terminal 15 in a non-electrical form. To this end the control signal from control-voltage generator 17 is transmitted to an energy converter 20 from which the control signal is applied to the control terminal 15 of the gain-control element 14 in the form of light energy. In this invention an incandescent lamp in the converter 20 converts the control signal into light energy which affects a photosensitive device in the gain-control element 14 as will be explained in more detail later.

The control voltage developed by the control-voltage generator 17 is delivered at terminal 21 and is transmitted not only to the converter 20 of its own channel but also to the converters of a plurality of channels whose peak frequency ($f$) is adjacent to the frequency of its own channel. For this purpose the terminal 21 of control-voltage generator 17 is connected to one input terminal of an adder circuit 23. The adder 23 serves to add the control voltages of a plurality of channels, preferably those channels whose peak frequencies are adjacent to the peak frequency of its own channel. Accordingly, the control voltage from terminal 21 is also transmitted to the adder 23 of a plurality of other channels, but in the interest of clarity these connections are not shown in FIGURE 1. The wires 22 of FIGURE 1 are connected to the terminals 21 of other channels, thus providing an interconnection of channels (not shown in FIGURE 1, but explained later in connection with FIGURE 2) which provides an adding of control voltages in the adder 23. The adder 23 may be a simple device and will be described in detail later. Each adder 23 adds the control voltages of a group of channels of adjacent frequencies. The total width of the frequency range covered by each adder 23 is wider than any anticipated narrow band filtering of the seismic signal due to the layered earth. In this manner any narrow band earth filtering will give rise to only a small part of the control signal in any one channel, and the channel will not compensate for such filtering. On the other hand smooth filtering that affects all members of a group of channels substantially equally, will have a substantial effect on each channel's control and therefore this type of filtering will be compensated by the apparatus of this invention. Accordingly, the gain control system comprising elements 14 17, 20, and 23 will tend to equalize variations in the amplitude of signals transmitted by the respective filters 12, but because of the summing action that takes place in the adder 23 interposed between the control-voltage generator 17 and the gain-control element 14, the equalization produced by the system compensates only for smooth variations in the attenuation function of prior filtering, whereas sharp variations in the attenuation function cannot be compensated because of the averaging effect of the added control voltages from channels of adjacent frequencies. It is by this means that the apparatus achieves compensation for relatively smooth variations in attenuation, but allows narrow band attenuation variations to remain in the transmitted signal.

The signals delivered at the respective output terminal 16 of the respective filter channels A, B, C, etc., are connected in parallel to a summing circuit 25 to be described later. The summing circuit 25 serves to recombine the instantaneous signals from the filter channels A, B, C, etc., and the combined output is delivered at output terminal 26. The summing circuit 25 adds the instantaneous signals from all of the channels and serves to restore the original signal compensated only for smooth variations in prior attenuation.

As previously indicated, the control signal delivered to the control terminal 15 is in the form of light whose intensity is varied. The converter 20 is therefore a transducer for converting the electrical energy output of the adder 23 into light energy that is directed to a photoresistive cell connected in the circuit of the gain-control element 14 as will be explained. The wide range of action of commercially available photoresistive elements permits a high degree of control to be achieved over a wide range of amplitudes of the incoming signal.

Specific examples of elements 12, 14, 17, 20, and 23 will now be described.

Figure 3:
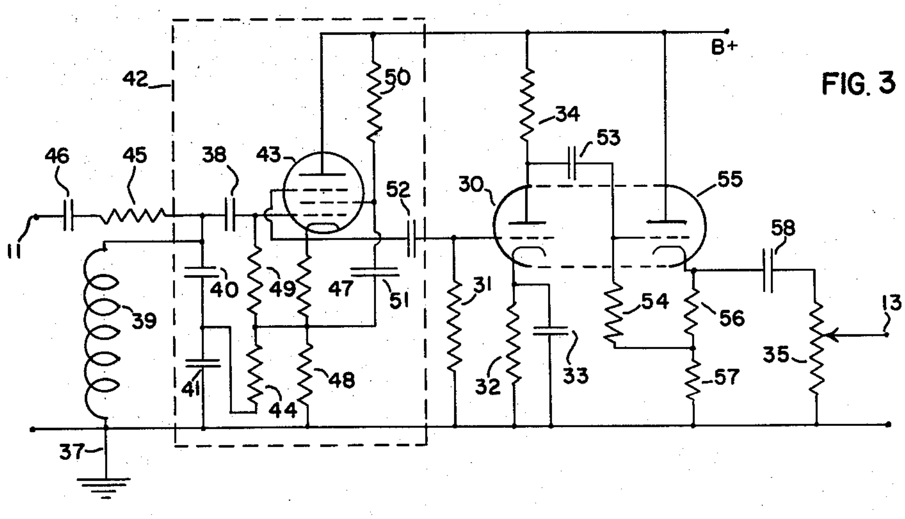
FIGURE 3 is a schematic wiring diagram showing one type of high-Q resonant filter that may be employed in this invention.

The narrow band-pass filters 12 may be of any well-known type, and by way of example a high-Q resonant type of filter is shown in detail in FIGURE 3. The filter comprises a tube 30 having a conventional grid resistor 31, cathode resistor 32 with bypass condenser 33, and plate resistor 34. The tank circuit of the filter system, comprises inductance 39 with condensers 40 and 41 connected as shown and the values of the inductance and condensers are chosen to peak the filter at the desired frequency. In order to increase the Q-value of the resonant tank circuit there is connected to it a conventional Q-multiplier network made up of elements inside the dotted outline 42. The Q-multiplier comprises pentode tube 43 connected as indicated. A resistor 44 is connected to the junction of condensers 40 and 41 and connects to the junction of resistors 47 and 48 in the cathode circuit of tube 43. Resistor 49 serves as a grid resistor. Proper screen voltage is obtained through resistor 50 which has bypass condenser 51. The effect of the network 42 is to increase the Q-value of the resonating tank circuit comprising inductance 39 and condensers 40 and 41, and the particular value of Q obtained depends on the resistance values of resistors 44 and 45. Accordingly, the resistors 44 and 45 are chosen for each filter so that the band width of the filter channel A, B, C, etc. has the desired value. The tank circuit and its Q-multiplier is coupled to tube 30 by means of condenser 52.

The output of tube 30 is transmitted through coupling condenser 53 to a cathode-follower stage with tube 55 having grid resistor 54 and cathode resistors 56 and 57. The output signal is transmitted through coupling condenser 58 to a potentiometer 35, whose slider is connected to terminal 13. The input signal to the filter is applied to terminal 11 and is transmitted to the tank circuit through condenser 46 and resistor 45, the other side of the input being grounded as shown at 37. The purpose of potentiometer 35 is to permit adjusting the various filters to equal gain up to the terminal 13. Tubes 30 and 55 shown as triodes may be in a common envelope. Heater circuits and B+ supply are conventional and are not shown in any of the figures.

By means of the circuit illustrated in FIGURE 3 a very narrow pass band may be obtained. It is preferred that the pass bands of the respective channels A, B, C, etc. be of substantially equal width as measured in c.p.s. In the application of the invention to the analysis of reflection seismograms it has been found desirable to use a constant width pass band for each of the filter channels, width of the pass band being less than 1 c.p.s., preferably from 0.2 to 1.0 c.p.s. in width as measured at the 3 db point. A pass band whose width is in this range is easily obtained by means of the high-Q resonant filter circuit as shown in FIGURE 3.

In the high-Q resonant filter circuit of FIGURE 3 the values of inductance 39 and condensers 40 and 41 are chosen so that the peak frequency of the particular channels A, B, C, etc. has the desired value ($f_1$, $f_2$, $f_3$, . . . etc.). It has been further found desirable to space the pass bands to which the respective filter 12 are adjusted so that they are distributed over the range of frequencies of interest. In seismic prospecting the range of frequencies of interest is from about 2 c.p.s. to about 200 c.p.s. A logarithmic frequency distribution is preferred for the reason that the high-Q filters having constant frequency band width at the 3 db point have increasing frequency width at the 6 db point, and in order to prevent overlap the bands are given increased spacing at the higher frequencies. It has been found that a logarithmic distribution of peak frequencies avoids overlap of the bands, and gives adequate coverage.

Figure 4:
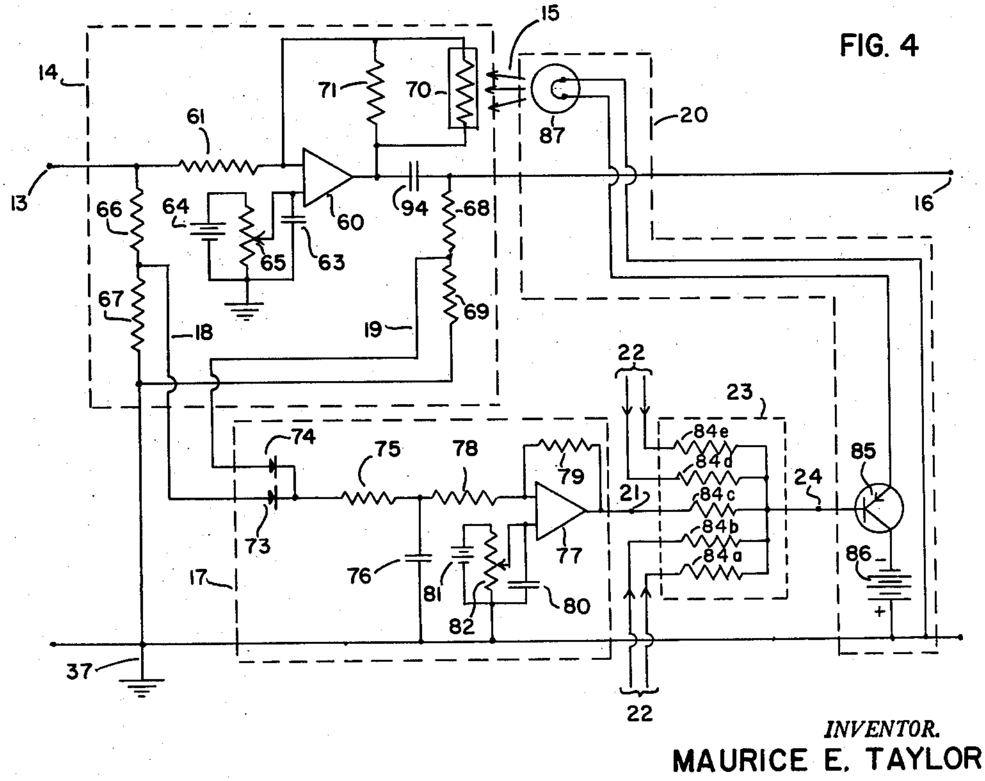
FIGURE 4 is a schematic wiring diagram showing one type of signal-actuated gain control system that may be employed in this invention.

FIGURE 4 shows a detailed schematic wiring diagram of the gain-control element 14, control-voltage generator 17, adder 23, and converter 20 of FIGURE 1. The filtered signal output from the filter shown in FIGURE 3 is applied to terminal 13 of FIGURE 4. The high side of the circuit is shown connected to terminal 13, it being understood that the other terminal remains at ground as at 37. The elements inside the dotted outline 14 of FIGURE 4 comprise the gain-control element whose output is delivered at terminal 16. The gain-control element 14 comprises operational amplifier 60 having a feedback connection such as is commonly employed in operational-amplifier circuits. The filtered signal is applied to one terminal of the amplifier through resistor 61. The feedback connection is provided by a photosensitive element 70 paralleled by a resistor 71 connected from the output to the input terminals of amplifier 60 as shown. The second input of amplifier 60 is connected to ground thru condenser 63 and a bias may be applied to this terminal of the amplifier by means of battery 64 and potentiometer 65. The purpose of the bias circuit comprising elements 64 and 65 is to adjust the operating point of amplifier 60, and this is provided so that adjustment can conveniently be made for slight variations in the characteristics of the amplifier 60 in the various channels A, B, C, etc. In the input circuit of the amplifier 60 a voltage divider is provided by resistors 66 and 67 whose junction point is connected by wire 18 to the control-voltage generator 17 to be described. In the output circuit of amplifier 60 a voltage divider comprising resistors 68 and 69 is again provided and the junction of these resistors is connected via lead 19 to the control voltage generator 17 to be described. It is well known that the gain provided by amplifier 60 connected as shown depends on the ratio of resistors 61 to the resistance of parallel combination of resistors 70 and 71 of which the resistance of 70 is controllable by varying the intensity of light shining on it. Resistor 70 is a photoresistive element such as, for example, a cadmium sulfide cell well known in the art. A single photosensitive resistor (cadmium sulfide cell) may be employed, but it is usually preferable to employ more than a single unit in a series and/or parallel network in order to achieve the particular resistance value and range of variation desired. Inasmuch as resistor 70 changes its resistance when exposed to light it is possible to adjust the gain of amplifier 60 by the amount of light shining on the cadmium sulfide cell 70. The value of resistor 71 is chosen to provide an upper limit to the gain when no light falls on the element 70. Output of amplifier 60 is transmitted through a blocking condenser 94 to terminal 16.

The control-voltage generator comprises the elements inside the dotted outline 17 of FIGURE 4. Input signal to the control-voltage generator 17 is provided over connection 19 from the output of gain-control element 14. In many instances this connection will suffice to provide for obtaining a substantially flat automatic volume control effect, but it is preferred to include connection 18 as shown in order to provide an especially flat A.V.C. action. The A.C. signals transmitted by leads 18 and 19 are rectified by rectifiers 73 and 74 and the resulting pulsating direct current is filtered by a time-constant filter comprising resistor 75 and condenser 76. The time-constant filter comprising elements 75 and 76 provides for averaging the control action over a reasonable time interval, for example about 0.3 sec. is satisfactory for most seismic operations. An operational amplifier 77 is connected with one of its input terminals connected to condenser 76 through resistor 78. A feedback connection between the output and input of amplifier 77 is provided by resistor 79. The second input terminal of amplifier 77 is connected to ground via condenser 80 and a bias may be applied to this terminal of the amplifier by means of battery 81 and potentiometer 82, the purpose of the bias circuit again being to provide for adjusting slight variations in the operating characteristics of the amplifiers 77 in the various channels A, B, C, etc. The amplifier 77 connected as shown operates as a D.C. amplifier and the output voltage delivered at terminal 21 is one of the control voltages that is employed to control the gain-control element 14 through the controllable resistor (photoresistive cadmium sulfide cell) 70.

Terminal 21 of the control-voltage generator 17 is connected to one of the input terminals of adder 23. The adder 23 serves to combine the control voltages delivered by a group of control-voltage generating elements 17 of a group of filter channels A, B, C, etc. Inasmuch as the control voltages delivered by the respective elements 17 at their terminals 21 are in the form of direct current, they may be added by simply transmitting the control voltages to a common connecting point through an appropriate load. By way of example FIGURE 4 shows the adder 23 to add five control voltages from the terminals 21 of five channels, one being shown directly so connected in FIGURE 4 and four being indicated as connected to terminals 21 of four other channels by means of leads 22. The common load for the adder is formed by the input impedance of transistor 85 which is fed by the channels. The number of channels whose control voltages are added depends on the width of the individual channels' pass bands and on the nature of the narrow band frequency attenuation anticipated in the area being prospected. The adder 23 should add the control voltages for enough channels so that the frequency range of channels included in any adder 23 is wider than the frequency width of a characteristic narrow band "peak" or "valley" that may occur in the frequency attenuation of the seismic signal due to the layered earth through which the signal was previously transmitted. Under some circumstances it is desirable to weight the respective control voltages unequally in making the addition, and this is conveniently done by employing different values for the load resistors of the channels whose control voltages are added in the adder 23. Thus in FIGURE 4 there are shown five resistors 84($a$), 84($b$), 84($c$), 84($d$) and 84($e$), all of whose signals are combined at terminal 24. The resistor 84($c$) connected to terminal 21 of the control-voltage generating element 17 of its own channel may have a lower resistance value than that of 84($a$), 84($b$), 84($d$) and 84($e$) thereby increasing the contribution of the center channel, and the outer resistors 84($a$) and 84($e$) may have higher resistances than any of the others in order to taper off the control contribution of those channels whose peak frequency is farthest removed from the frequency of the controlled channel.

Output of the adder circuit 23 is delivered at terminal 24 and transmitted to the converter 20. It is preferred to convert the combined control voltage to light energy and to this end the output of he adder is applied to the base of a PNP type transistor 85. The collector of transistor 85 is connected to a voltage supply 86, as for example 4½ volts. The emitter of transistor 85 is connected to an incandescent lamp 87 arranged in proximity to photosensitive resistor 70 of gain-control element 14. It is apparent that the gain of gain-control element 14, being determined by the value of resistor 70, can be varied by the varying light output of lamp 87. It has been found that this system of A.V.C. is particularly stable and can be designed to have a very large range of control, so that in a steady-state test a large range of A.C. signal level at input terminal 13 will result in substantially no change of A.C. signal level at output terminal 16. In order to make the A.V.C. action as nearly independent of input as possible the resistors 66, 67, 68, and 69 are appropriately adjusted, and if desired, resistors 66 and 67 may be combined into a single adjustable potentiometer, as also resistors 68 and 69. It is apparent that the control-voltage generator 17 samples signal over lead 18 connected to a point between the filter 12 and gain-control element 14, and also samples signal over lead 19 connected to the output of the gain-control element 14 as shown in the block diagram FIGURE 1.

Figure 2:
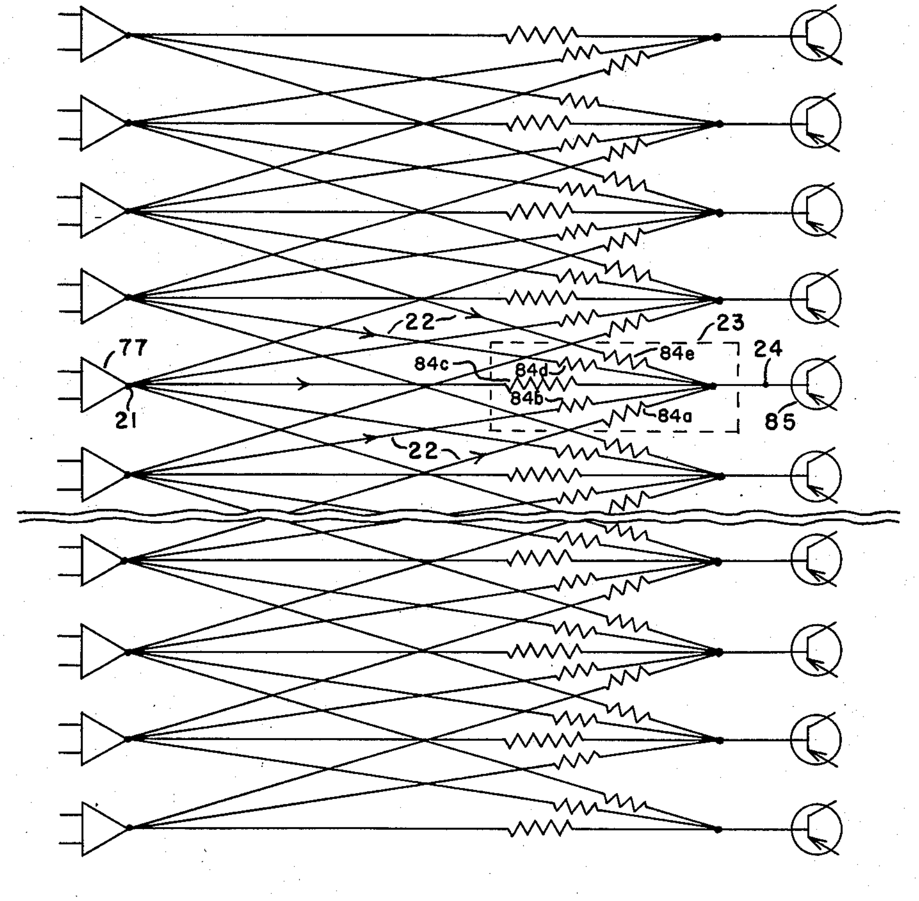
FIGURE 2 is a schematic wiring diagram showing the gain control adder circuit employed in this invention.

FIGURE 2 is a schematic wiring diagram showing how each adder 23 combines the control signals of a number of channels. FIGURE 1 shows the function of the adder 23 in the block diagram, and FIGURE 4 shows how the channel weighting resistors 84 are connected in each channel, and FIGURE 2 shows the interconnection of channels in an example having five channels connected to each adder. Special appropriate weighting resistors 84 are of course employed in the adder 23 of channels A and Z at the extremities of the total frequency range covered by the system. The control signal from terminal 21 of each channel is transmitted to a number of adder units 23 via leads 22. In FIGURE 2 only five channels are indicated as connected to each adder, but the number of channels whose control signals are added in elements 23 depends on the nature of the CVL obtained in the area being investigated, and on the spacing of the frequencies of the various filter channels. The span of frequencies included by any one adder unit 23 should exceed the frequency width of any "peak" or "valley" in the frequency distribution curve of the CVL. FIGURE 2 shows the output from the adder being transmitted to the input element 85 of converter 20, and shows the signals to be added as being derived from the output of amplifiers 77, it being understood that other elements of the system are omitted for clarity of showing the control-signal adding function only in FIGURE 2.

Figure 5:
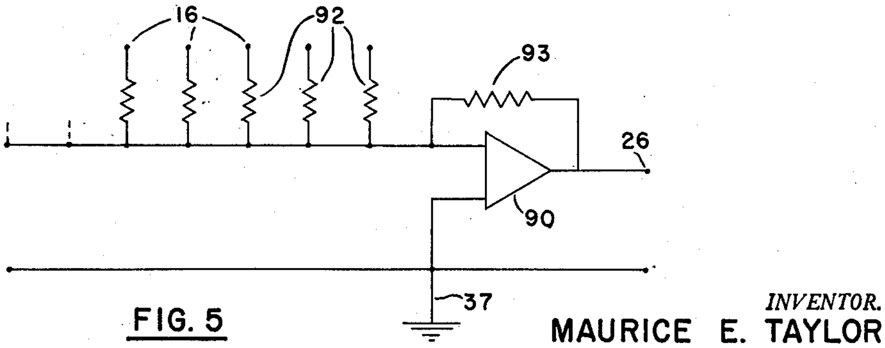
FIGURE 5 is a schematic wiring diagram of one type of summing circuit that may be employed in this invention.

Signals delivered at the output of the respective channel terminals 16 are combined in a summing circuit 25 as shown in detail in FIGURE 5. The summing circuit comprises operational amplifier 90 one of whose input terminals is grounded at 37 and the other of whose input terminals is connected via a plurality of parallel resistors 92 to the respective channel output terminals 16. Resistor 93 is connected from the input to the output of amplifier 90 as is conventional in operational amplifier circuits to fix the gain of the network. By means of the circuit of FIGURE 5 the instantaneous sum of the instantaneous signals from the respective filter channels A, B, C, etc. is delivered at output terminal 26. The output signal will be the instantaneous sum of the signals passing through the filter channels, each channel having made a correction in amplitude of the frequency to which it is tuned, which correction is a weighted sum of the signal strength in the channel plus the signal strength in channels of adjacent frequencies.

By way of example only, and not by way of limitation the various elements forming components of the circuits of this invention may have values given in the following table:

| Element | Component | Specification |
|---|---|---|
| 30 | Vacuum tube | ½ 12AU7. |
| 31 | Resistor | 1 megohm. |
| 32 | Resistor | 3,900 ohms. |
| 33 | Condenser | 10–100 mfd. (See Note*). |
| 34 | Resistor | 56,000 ohms. |
| 35 | Potentiometer | 1,000 ohms. |
| 38 | Condenser | 10 mfd. |
| 39 | Inductance | }Vary to adjust peak frequency of filter. |
| 40 | Condenser | |
| 41 | Condenser | |
| 43 | Vacuum tube | 6AU6. |
| 44 | Resistor | }Chosen to adjust Q of circuit. |
| 45 | Resistor | |
| 46 | Condenser | Normally 1 mfd. (See Note*). |
| 47 | Resistor | 2,400 ohms. |
| 48 | Resistor | 62,000 ohms. |
| 49 | Resistor | 470,000 ohms. |
| 50 | Resistor | 200,000 ohms. |
| 51 | Condenser | 2 mfd. |
| 52 | Condenser | 1 mfd. |
| 53 | Condenser | 1 mfd. |
| 54 | Resistor | 510,000 ohms. |
| 55 | Vacuum tube | ½ 12AU7. |
| 56 | Resistor | 1,800 ohms. |
| 57 | Resistor | 2,200 ohms. |
| 58 | Condenser | 10–100 mfd. (See Note*). |
| 60 | Operational Amplifier | Philbrick Type K2XA. |
| 61 | Resistor | 6,200 ohms. |
| 63 | Condenser | .047 mfd. |
| 64 | Battery | 1.4 volts. |
| 65 | Potentiometer | 1 megohm. |
| 66 | Resistor | }Total 10,000 ohms. Vary to adjust AVC action. |
| 67 | Resistor | |
| 68 | Resistor | }Total 10,000 ohms. Vary to adjust AVC action. |
| 69 | Resistor | |
| 70 | Cadmium Sulfide Cell | RCA No. 7163. |
| 71 | Resistor | 510,000 ohms. |
| 73 | Rectifier | Type 1N100. |
| 74 | Rectifier | Type 1N100. |
| 75 | Resistor | 100,000 ohms. |
| 76 | Condensor | Normally 1 mfd. (See Note*) |
| 77 | Operational Amplifier | Philbrick Type K2XA. |
| 78 | Resistor | 100,000 ohms. |
| 79 | Resistor | 300,000 ohms. |
| 80 | Condenser | .047 mfd. |
| 81 | Battery | 1.4 volts. |
| 82 | Potentiometer | 1 megohm. |
| 84 | Resistor | Circa 3,000 ohms, as required by weighting desired. |
| 85 | Transistor | Type 2N301A. |
| 86 | Battery | 4½ volts. |
| 87 | Lamp | Type No. 49. |
| 90 | Operational Amplifier | Philbrick Type K2XA. |
| 92 | Resistor | 90,000 ohms. |
| 93 | Resistor | 1,000 ohms. |
| 94 | Condenser | Normally 1 mfd. (See Note*). |

* NOTE.—The normal value of this component is that used for intermediate and high frequency bands. However, this component is frequency dependent and must be properly chosen at the low frequency end of the spectrum in order to allow the circuits to function properly at these low frequencies as will be evident to those skilled in the art.

In seismic prospecting operations the system of this invention may be employed either during the original recording of a seismogram in the field or during rerecording in a central processing office, although the latter is preferred. In the event that the invention is employed in a central processing facility the apparatus of this invention is connected between any two stages in a playback or recording amplifier. Any filtering desired to be applied during the rerecording should of course be placed in amplifier stages subsequent to the apparatus of this invention because the invention will automatically compensate for prior filtering. When the invention is employed in processing seismograms, the output level is adjusted by means of a conventional gain control or attenuator in or after amplifier 90 to the appropriate level required to drive the recording head. A conventional gain control including amplification if necessary (not shown) is employed to control the input signal applied to input terminal 10 in order to bring the input signal to a level within the operating range of the circuits of the invention.

What I claim as my invention is:

1. An electrical attenuation equalizer comprising
a plurality of signal transmission channels each having a signal input terminal and a signal output terminal,
each said channel including a band-pass filter element whose band pass has a different peak frequency and followed by a gain-control element adapted to vary the gain of said channel in response to a control voltage applied at a control terminal thereof, a plurality of control-voltage generating circuits adapted to generate a control voltage at an output terminal thereof in response to a signal applied at an input terminal thereof, means connecting the input terminals of said control-voltage generating circuits to a point in said respective channels subsequent to the filter element thereof, means connecting the output terminal of each said control-voltage generating circuit to the control terminals of a plurality of said gain-control circuits including the gain-control circuit of the channel to which the input terminal of said control-voltage generating circuit is connected, a signal summing circuit having a plurality of input connections whose instantaneous signals are added and delivered at an output terminal, means connecting the output terminals of said signal transmission channels to the respective input connections of said signal summing circuit, and means connecting the input terminals of said signal transmission channels to a common terminal to which the signal to be equalized is applied, whereby the signal delivered at the output terminal of said signal summing circuit is compensated for smooth prior filtering but is uncompensated for prior sharp narrow-band filtering.

2. An electrical attenuation equalizer comprising a plurality of signal transmission channels each having a signal input terminal and a signal output terminal, each said channel including a band-pass filter element whose band pass has a different peak frequency and followed by a gain-control circuit adapted to vary the gain of said channel in response to the light energy falling on a controlled element thereof, a plurality of control-voltage generating circuits adapted to generate a control voltage at an output terminal thereof in response to a signal applied at an input terminal thereof, means connecting the input terminals of said control-voltage generating circuits to a point in said respective channels subsequent to the filter element thereof, a plurality of energy converters producing light energy in proportion to the electrical signal applied to an input terminal thereof, means connecting the output terminal of each said control-voltage generating circuit to the input terminals of a plurality of said energy converters including the energy converter of the channel to which the input terminal of said control-voltage generating circuit is connected, means exposing said controlled element of said gain-control circuit to the light of said respective energy converter, a signal summing circuit having a plurality of input connections whose instantaneous signals are added and delivered at an output terminal, means connecting the output terminals of said signal transmission channels to the respective input connections of said signal summing circuit, and means connecting the input terminals of said signal transmission channels to a common terminal to which the signal to be equalized is applied, whereby the signal delivered at the output terminal of said signal summing circuit is compensated for smooth prior filtering but is uncompensated for prior sharp narrow band filtering.

3. An electrical attenuation equalizer comprising a plurality of signal transmission channels each having a signal input terminal and a signal output terminal, each said channel including a band-pass filter element whose band pass has a different peak frequency in the frequency range of interest, said peak frequencies being logarithmically distributed over the frequency range of interest, each said band-pass filter element being followed by a gain-control element adapted to vary the gain of said channel in response to a control voltage applied at a control terminal thereof, a plurality of control-voltage generating circuits adapted to generate a control voltage at an output terminal thereof in response to a signal applied at an input terminal thereof, means connecting the input terminals of said control-voltage generating circuits to a point in said respective channels subsequent to the filter element thereof, means connecting the output terminal of each said control-voltage generating circuit to the control terminals of a plurality of said gain-control elements including the gain-control element of the channel to which the input terminal of said control-voltage generating circuit is connected, a signal summing circuit having a plurality of input connections whose instantaneous signals are added and delivered at an output terminal, means connecting the output terminals of said signal transmission channels to the respective input connections of said signal summing circuit, and means connecting the input terminals of said signal transmission channels to a common terminal to which the signal to be equalized is applied, whereby the signal delivered at the output terminal of said signal summing circuit is compensated for smooth prior filtering but is uncompensated for prior sharp narrow-band filtering.

4. An electrical attenuation equalizer comprising a plurality of signal transmission channels each having a signal input terminal and a signal output terminal, each said channel including a band-pass filter element whose band pass has a different peak frequency and followed by a gain-control element adapted to vary the gain of said channel in response to a control voltage applied at a control terminal thereof, a plurality of control-voltage generating circuits adapted to generate a control voltage at an output terminal thereof in response to a signal applied at an input terminal thereof, means connecting the input terminals of said control-voltage generating circuits to a point in said respective channels subsequent to the filter element thereof, means connecting the output terminal of each said control-voltage generating circuit to the control terminals of a plurality of said gain-control circuits including the gain-control circuit of the channel to which the input terminal of said control-voltage generating circuit is connected, the control signal to each of said control terminals being derived from a plurality of said signal transmission channels whose filter peak frequencies cover a range of frequencies that is substantially wider than narrow-band filtering previously undergone by the signal to be equalized, a signal summing circuit having a plurality of input connections whose instantaneous signals are added and delivered at an output terminal, means connecting the output terminals of said signal transmission channels to the respective input connections of said signal summing circuit, and means connecting the input terminals of said signal transmission chanels to a common terminal to which the signal to be equalized is applied, whereby the signal delivered at the output terminal of said signal summing circuit is compensated for smooth prior filtering but is uncompensated for prior filtering whose frequency range is narrower than that covered by the control signals applied to said control terminals.

5. A method of removing from an electrical signal the effect of filtering that is broad with respect to frequency while retaining in the signal the effect of narrow-frequency-band filtering which comprises separating the signal into a large plurality of signal components each of whose individual frequency content is in a different narrow frequency band and each of which has an average signal level, combining the average signal levels with weighting of a smaller plurality of said signal components in groups to form a weighted average signal level for each said group of signal components and in which the weighting provides a desired contribution of each respective component signal level included in said group, controlling the average signal level of each of said signal components to be substantially invariant with respect to the weighted average signal level of one of said groups of said signal components, and combining the instantaneous values of said controlled signal components.

6. A method of removing from an electrical signal the effect of filtering that is broad with respect to frequency while retaining in the signal the effect of narrow-frequency-band filtering which comprises separating the signal into a plurality of signal components each of whose individual frequency content is in a different narrow frequency band and each of which has an average signal level, controlling the average signal level of each of said signal components to be substantially invariant with respect to the weighted average signal level of a plurality of said signal components which includes the respective individual component and components of frequency bands adjacent thereto, said weighted average signal level being taken to include the signal level of the respective controlled component and the signal level of components whose frequency bands are adjacent to that of the controlled component and said weighting being such as to provide a desired contribution of the respective component signal levels to the weighted average, and combining the instantaneous values of the controlled signal components.

7. A method of processing an electrical signal which comprises separating the signal into a large plurality of signal components each of whose individual frequency content is in a different narrow frequency band and each of which has an average signal level, combining the average signal levels with weighting of a smaller plurality of said signal components in groups to form a weighted average signal level for each said group of signal components and in which the weighting provides a desired contribution of each respective component signal level included in said group, generating a plurality of control signals each of which is representative of the weighted average signal level of one of said groups of signal components, modifying the relative amplitudes of said signal components in accordance with a respective one of said control signals, and combining the instantaneous values of the modified signal components, whereby prior wide-band filtering of the electrical signal is compensated substantially without compensating for prior narrow-band filtering.

8. A method of processing an electrical signal which comprises separating the signal into a large plurality of signal components each of whose individual frequency content is in a different narrow frequency band and each of which has an average signal level, combining the average signal levels with weighting of a smaller plurality of said signal components in groups to form a weighted average signal level for each said group of signal components and in which the weighting provides a desired contribution of each respective component signal level included in said group, generating a plurality of control signals each of which is representative of the weighted average signal level of one of said groups of signal components, modifying the relative amplitudes of said signal components in accordance with a respective one of said control signals, said weighted average signal level being taken from the group that includes the signal level of the respective controlled component and the signal level of components whose frequency bands are adjacent to that of the controlled component, said weighted average being obtained by weighting each included signal level by an amount that decreases with increasing difference between the frequency of the controlled component and the frequency of the adjacent component band whose signal level is included in the weighted average, and combining the instantaneous values of the modified signal components, whereby prior wide-band filtering of the electrical signal is compensated substantially without compensating for prior narrow-band filtering.

References Cited in the file of this patent

UNITED STATES PATENTS

| | | |
|---|---|---|
| 2,395,159 | Albin | Feb. 19, 1946 |
| 2,558,868 | McCarty | July 3, 1951 |